US008748555B2

(12) United States Patent
Allen

(10) Patent No.: US 8,748,555 B2
(45) Date of Patent: Jun. 10, 2014

(54) STRUCTURALLY PRECISE POLY(PROPYLENE CARBONATE) COMPOSITIONS

(75) Inventor: Scott D. Allen, Ithaca, NY (US)

(73) Assignee: Novomer, Inc., Ithaca, NY (US)

( * ) Notice: Subject to any disclaimer, the term of this patent is extended or adjusted under 35 U.S.C. 154(b) by 230 days.

(21) Appl. No.: 13/380,212

(22) PCT Filed: Jul. 1, 2010

(86) PCT No.: PCT/US2010/040829
§ 371 (c)(1),
(2), (4) Date: Dec. 22, 2011

(87) PCT Pub. No.: WO2011/005664
PCT Pub. Date: Jan. 13, 2011

(65) Prior Publication Data
US 2012/0156410 A1 Jun. 21, 2012

Related U.S. Application Data

(60) Provisional application No. 61/223,042, filed on Jul. 5, 2009, provisional application No. 61/224,134, filed on Jul. 9, 2009.

(51) Int. Cl.
C08G 64/00 (2006.01)
C08G 63/02 (2006.01)

(52) U.S. Cl.
USPC .......... 528/196; 428/35.7; 428/220; 428/412; 524/424; 524/590; 524/612; 528/198; 528/398; 528/405

(58) Field of Classification Search
USPC ......... 428/35.7, 220, 412; 524/424, 590, 612; 528/196, 198, 398, 405
See application file for complete search history.

(56) References Cited

U.S. PATENT DOCUMENTS 7,304,172 B2  12/2007  Coates et al.

FOREIGN PATENT DOCUMENTS

| JP | 2007-217611 A | 8/2007 |
| JP | 2008-081518 | 4/2008 |
| KR | 10-0853358 B1 | 8/2008 |
| KR | 10-0853358 B1 | 8/2008 |
| WO | WO-03/29325 A1 | 4/2003 |
| WO | WO-2006/061237 A1 | 6/2006 |
| WO | WO2008/136591 | 11/2008 |
| WO | WO-2008/150033 A1 | 12/2008 |
| WO | WO-2010/147421 A2 | 12/2010 |

OTHER PUBLICATIONS

International Search Report for PCT/US2010/040829 mailed Feb. 25, 2011.
Eun Kyung Noh et al. J. Am. Chem. Soc. 2007, vol. 129, pp. 8082-8083.
Zengquan Qin et al. Angew. Chem. Int. Ed. 2003, vol. 42, pp. 5484-5487.
Chisholm, M. H. et al., Poly(propylene carbonate). 1. More about Poly(propylene carbonate) formed from the copolymerization of propylene oxide and carbon dioxide employing a zinc glutarate catalyst, Macromolecules, 35: 6494-6504 (2002).
Coates, G.W. and Moore, D.R., Discrete Metal-Based Catalysts for the Copolymerization Of CO2 and Epoxides: Discovery, Reactivity, Optimization, and Mechanism, Angewandte Chemie International Edition, 43: 6618-6639 (2004).
Darensbourg, D. J., Making plastics from carbon dioxide: salen metal complexes as; catalysts for the production of polycarbonates from epoxides and CO2, Chemical Reviews,; 107(6):2388-410 (2007).
Gao, L. J. et al., Copolimerization of Carbon Dioxide and Propylene Oxide with Zinc Glutarate as Catalyst in the Presence of Compounds Containing Active Hydrogen, Journal of Applied Polymer Science, 104, 15-20 (2007).
Nakano, K. et al., Selective Formation of Polycarbonate over Cyclic Carbonate: Copolymerization of Epoxides with Carbon Dioxide Catalyzed by a Cobalt (III) Complex with a Piperidinium End-Capping Arm, Angewandte Chemie International Edition, 45: 7274-7277 (2006).
Sugimoto, H. et al., Alternating Copolymerization of Carbon Dioxide and Epoxide Catalysed by an Aluminum Schiff Base-Ammonium Salt System, Journal of Polymer Science: Part A: Polymer Chemistry, 43: 4172-4186 (2005).

Primary Examiner — Terressa Boykin
(74) Attorney, Agent, or Firm — Choate, Hall & Stewart, LLP; Charles E. Lyon; John P. Rearick

(57) ABSTRACT

The present invention provides articles made from structurally precise poly(propylene carbonate) and blends thereof. Provided articles include articles manufactured from poly (propylene carbonate) wherein the PPC has a high head-to-tail ratio, low ether linkage content, narrow polydispersity and low cyclic carbonate content. Also provided are articles made from, incorporating or coated with structurally precise PPC.

23 Claims, 3 Drawing Sheets

| Property | Units | Novomer PPC | LLDPE | LDPE/PPC 70/30 blend | LLDPE/PPC 50/50 blend | HDPE | HDPE/PPC 70/30 blend | HDPE/PPC 50/50 blend | PP | PP/PPC 70/30 blend | PP/PPC 50/50 blend |
|---|---|---|---|---|---|---|---|---|---|---|---|
| Tensile Strength at Yield | MPa | 39.5 | 11.2 | 12.9 | 15.4 | 20.6 | 23.6 | 25.9 | 32.5 | 28.9 | 28.8 |
| Elongation at Yield | % | 3.24% | 64% | 6.21% | 3.72% | 6% | 5.75% | 3.33% | 6% | 4.22% | 3.76% |
| Flexural Modulus | MPa | 2525 | — | 344 | 823 | 664 | 1184 | 7493 | 1317 | 1763 | 2009 |
| Tensile Modulus | MPa | 1447 | 184 | 437 | 684 | 583 | 817 | 931 | 930 | 1024 | 1137 |
| Notched Izod Impact | ft·lb/inch | 0.6721 | No break | 5.73 | 3.713 | 2.25 | 1.19 | 1.016 | 1.5 | 1.38 | 1.62 |

FIGURE 3

STRUCTURALLY PRECISE POLY(PROPYLENE CARBONATE) COMPOSITIONS

CROSS REFERENCE TO RELATED APPLICATIONS

The present application is a U.S. national phase application under 35 U.S.C. 371 of PCT application no. PCT/US/10/40829, filed Jul. 1, 2010, which claims priority under 35 U.S.C. §119(e) to U.S. provisional application Ser. No. 61/223,042, filed Jul. 5, 2009 and U.S. provisional application Ser. No. 61/224,134, filed Jul. 9, 2009, the entire contents of each of which are hereby incorporated by reference.

FIELD

The invention pertains to the field of plastics. More particularly, the invention pertains to polymer compositions and blends containing structurally precise polypropylene carbonate) and articles made therefrom.

BACKGROUND

Poly(propylene carbonate) (hereinafter also referred to as "PPC") is a polymer known since the late 1960's when it was first synthesized by Inoue and co-workers. Until recently, high molecular weight PPC has been predominantly synthesized using zinc carboxylate catalysts to copolymerize propylene oxide and $CO_2$. The resulting material was the focus of intense investigation and several companies have explored applications for the material as a commodity thermoplastic. To date, PPC has been commercialized only as a sacrificial polymer in applications where the clean thermal decomposition of PPC is advantageous. Commercialization of the material for thermoplastic applications has been complicated by poor thermal and processing properties. Recently, transition metal complexes have been developed for the copolymerization of $CO_2$ and epoxides, but such complexes have not been fully exploited and/or optimized in the preparation of improved PPC materials.

SUMMARY

The present invention encompasses the recognition that PPC made with careful control of reaction parameters produces PPC with advantageous properties. For example, such control of certain reaction parameters leads to PPC that is more structurally precise than previous PPC compositions. Unexpectedly, this structurally precise PPC has improved processing characteristics that allow use of the material in numerous applications where PPC has performed poorly in the past.

The present invention provides, among other things, articles made from structurally precise poly(propylene carbonate) and blends thereof. In certain embodiments, the invention encompasses articles manufactured from structurally precise poly(propylene carbonate) wherein the PPC has a high head-to-tail ratio, low ether linkage content, narrow polydispersity and low cyclic carbonate content.

In some embodiments, the present invention provides articles made from, incorporating, or coated with structurally precise PPC. In some embodiments, the invention encompasses films, foamed articles, injection molded parts, blow molded containers, coatings, and dispersions made from structurally precise PPC. In certain embodiments, the structurally precise PPC is blended with one or more other polymers. In some embodiments, the structurally precise PPC or blends thereof further contain additives such as fillers, colorants, inhibitors, processing aids, plasticizers, cross-linking agents, and the like.

DEFINITIONS

Definitions of specific functional groups and chemical terms are described in more detail below. For purposes of this invention, the chemical elements are identified in accordance with the Periodic Table of the Elements, CAS version, Handbook of Chemistry and Physics, $75^{th}$ Ed., inside cover, and specific functional groups are generally defined as described therein. Additionally, general principles of organic chemistry, as well as specific functional moieties and reactivity, are described in *Organic Chemistry*, Thomas Sorrell, University Science Books, Sausalito, 1999; Smith and March *March's Advanced Organic Chemistry*, $5^{th}$ Edition, John Wiley & Sons, Inc., New York, 2001; Larock, *Comprehensive Organic Transformations*, VCH Publishers, Inc., New York, 1989; Carruthers, *Some Modern Methods of Organic Synthesis*, $3^{rd}$ Edition, Cambridge University Press, Cambridge, 1987; the entire contents of each of which are incorporated herein by reference.

Certain compounds of the present invention can comprise one or more asymmetric centers, and thus can exist in various stereoisomeric forms, e.g., enantiomers and/or diastereomers. Thus, inventive compounds and compositions thereof may be in the form of an individual enantiomer, diastereomer or geometric isomer, or may be in the form of a mixture of stereoisomers. In certain embodiments, the compounds of the invention are enantiopure compounds. In certain other embodiments, mixtures of enantiomers or diastereomers are provided.

Furthermore, certain compounds, as described herein may have one or more double bonds that can exist as either a Z or E isomer, unless otherwise indicated. The invention additionally encompasses the compounds as individual isomers substantially free of other isomers and alternatively, as mixtures of various isomers, e.g., racemic mixtures of enantiomers. In addition to the above-mentioned compounds per se, this invention also encompasses compositions comprising one or more compounds.

As used herein, the term "isomers" includes any and all geometric isomers and stereoisomers. For example, "isomers" include cis- and trans-isomers, E- and Z-isomers, R- and S-enantiomers, diastereomers, (D)-isomers, (L)-isomers, racemic mixtures thereof, and other mixtures thereof, as falling within the scope of the invention. For instance, a compound may, in some embodiments, be provided substantially free of one or more corresponding stereoisomers, and may also be referred to as "stereochemically enriched".

The term "epoxide", as used herein, refers to a substituted oxirane. Such substituted oxiranes include monosubstituted oxiranes, disubstituted oxiranes, trisubstituted oxiranes, and tetrasubstituted oxiranes. Such epoxides may be further optionally substituted as defined herein. In certain embodiments, epoxides comprise a single oxirane moiety. In certain embodiments, epoxides comprise two or more oxirane moieties.

The term "polymer", as used herein, refers to a molecule of high relative molecular mass, the structure of which comprises the multiple repetition of units derived, actually or conceptually, from molecules of low relative molecular mass. In certain embodiments, a polymer is comprised of only one monomer species (e.g., polyethylene oxide). In certain embodiments, a polymer of the present invention is a copolymer, terpolymer, heteropolymer, block copolymer, or tapered heteropolymer of one or more epoxides.

As used herein, the term "catalyst" refers to a substance the presence of which increases the rate and/or extent of a chemical reaction, while not being consumed or undergoing a permanent chemical change itself.

As used herein, the term "crystalline" refers to a polymer or polymer composition that possesses a first order transition or crystalline melting point (Tm) as determined by differential scanning calorimetry (DSC) or equivalent technique. The term may be used interchangeably with the term "semicrystalline". Relative to an amorphous polymer, a crystalline polymer or a composition thereof possesses higher degrees of ordered structure. In some embodiments, a crystalline polymer has characteristics that may be used to differentiate the material from amorphous material. In some embodiments, crystalline material is sufficiently crystalline such that is has a melting point.

As used herein, the term "crystallizable" refers to polymers or compositions thereof which are mainly amorphous in a certain state, but can crystallize upon being subjected to conditions and methods described herein.

As used herein, the term "amorphous" refers to a polymer lacking a melting point as determined by differential scanning calorimetry (DSC) or equivalent technique.

The term "head-to-tail" ratio is used in its conventional sense with regard to poly(propylene carbonate). Such terms may be used to describe and/or quantify the regioregularity of a polymer or polymer composition. The head-to-tail ratio of poly(propylene carbonate) can readily be determined by $^{13}$C-NMR spectroscopy, as described by, for example, Lednor, et al. *J. Chem. Soc., Chem. Comm.* 1985, 598-599.

The term "tacticity", as used herein, refers to the stereoregularity of the orientation of the propylene unit methyl groups in a polymer or polymer composition. Such stereoregularity may be considered apart from regioregularity (e.g., head-to-tail ratio), but for simplicity the definition below considers adjacent propylene units with the same regiochemistry. Pairs (diads) of methyl residues from adjacent (i.e., spaced apart by a carbonate unit) propylene units which have the same relative stereochemical orientation with respect to the polymer backbone are termed "meso" (m). Those of opposite stereochemical configuration are termed "racemic" (r). When three adjacent propylene units (triads) have methyl groups with the same orientation, the tacticity of the triad is "mm". If two adjacent propylene units in a three propylene unit sequence have the same stereochemical orientation, and that orientation is different from the relative configuration of the third unit, the tacticity of the triad is "mr". When the middle propylene unit has an opposite configuration from either propylene neighbor, the triad has "rr" tacticity. The fraction of each type of triad in the polymer bases on the total chain content can be determined and when multiplied by 100 indicates the percentage of that type found in the polymer. The tacticity as used herein is the percentage of isotactic "mm" triads.

The term "syndiotactic", as used herein, refers to a PPC polymer or polymer composition wherein the stereochemical orientation of propylene unit methyl groups alternates along the polymer chain. For example, a perfectly syndiotactic polymer has 100% racemic diads. A syndiotactic polymer or composition thereof need not be perfectly syndiotactic, but may contain a certain degree of syndiotacticity (e.g., slightly syndiotactic).

The term "isotactic", as used herein, refers to a PPC polymer or polymer composition wherein the relative stereochemical orientation of propylene unit methyl groups is the same along the polymer chain. For example, a perfectly isotactic polymer has 100% meso diads. A isotactic polymer or composition thereof need not be perfectly isotactic, but may contain a certain degree of isotacticity (e.g., slightly isotactic).

The term "melting point" for a material as used herein is defined as the highest peak among principal and secondary melting peaks as determined by Differential Scanning calorimetry (DSC).

BRIEF DESCRIPTION OF THE DRAWINGS

FIG. 3 shows physical data of PPC of the present invention blended with polyethylene and polypropylene at different concentrations.

DETAILED DESCRIPTION OF CERTAIN EMBODIMENTS

Figure 1:
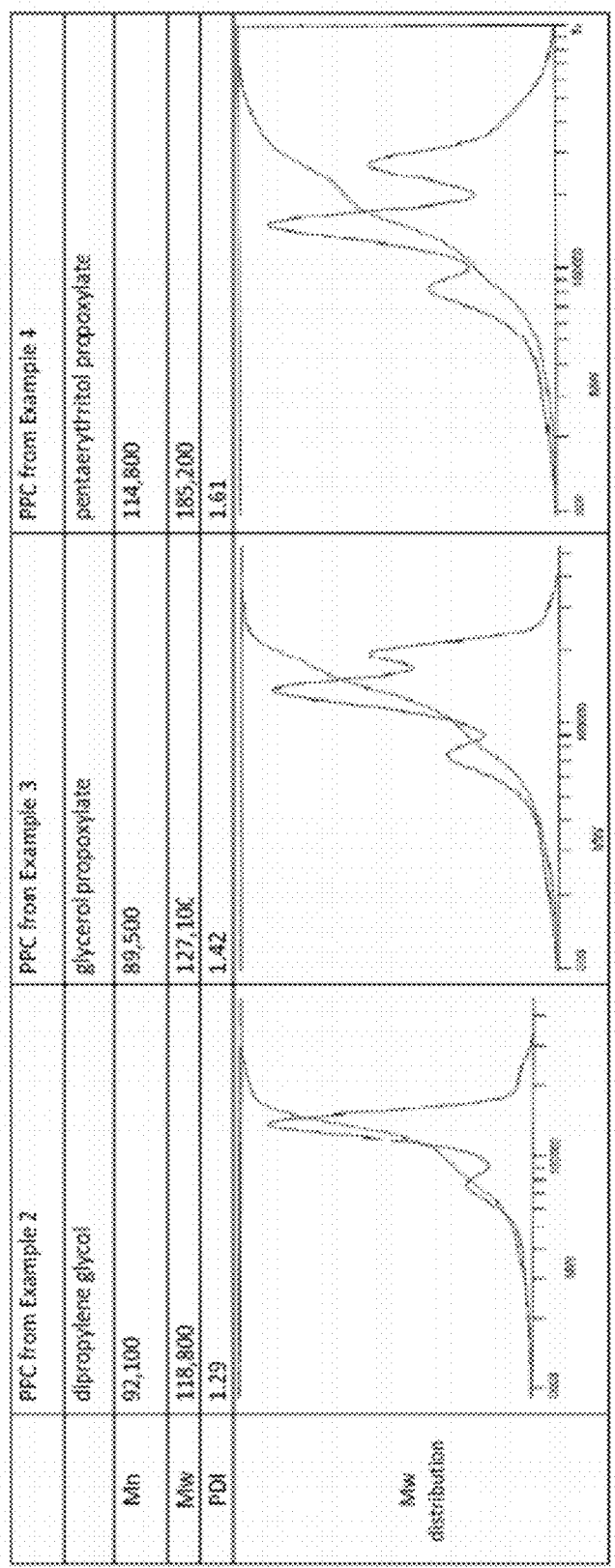
FIG. 1 shows the GPC traces, and molecular weight characteristics of samples of PPC produced in Examples 2, 3, and 4.

In some embodiments, the present invention encompasses articles fabricated from structurally precise poly(propylene carbonate) compositions. Poly(propylene carbonate) compositions from which these articles are made have physical characteristics that differentiate them from prior art poly(propylene carbonate) compositions typically formed by the polymerization of propylene oxide and carbon dioxide in the presence of heterogeneous zinc catalyst systems.

In general, poly(propylene carbonate) compositions of the present invention possess improved processing and performance characteristics relative to less structurally-precise poly (propylene carbonate) compositions from the prior art. These prior art materials contain a larger percentage of ether linkages, a lower head-to-tail ratio, a broader molecular weight distribution, a higher cyclic carbonate content, or combinations of any two or more of these. Poly(propylene carbonate) compositions disclosed herein are able to be processed by means including, but not limited to: injection molding; extrusion, melt processing, blowing, thermoforming, foaming, and casting under conditions where prior art poly(propylene carbonate) compositions degrade or otherwise perform poorly.

In some embodiments, the resulting poly(propylene carbonate)-containing articles thereby produced possess unexpectedly improved physical characteristics including, but not limited to: higher strength, less tendency toward thermal deformation, improved gas barrier properties, higher glass transition temperatures, and combinations of two or more of these.

It will be understood that in the present disclosure for provided polymer compositions and articles thereof, the terms "structurally precise poly(propylene carbonate)" and "poly(propylene carbonate)", unless otherwise noted, are used interchangeably.

In certain embodiments, structurally precise poly(propylene carbonate) compositions of the present invention are characterized in that they have a high head-to-tail ratio. In some embodiments, poly(propylene carbonate) compositions of the present invention are characterized in that they have a high percentage of carbonate linkages. In some embodiments, poly(propylene carbonate) compositions of the present invention are characterized in that they have a narrow polydispersity index. In certain embodiments, poly(propylene carbonate) compositions of the present invention are characterized in that they contain very low levels of cyclic carbonate.

In those embodiments where structurally precise poly(propylene carbonate) of the present invention is characterized by a high head-to-tail ratio, polymers have on average greater than about 80% of adjacent monomer units oriented head-to-tail. In certain embodiments, on average in provided polymer compositions, greater than about 85% of adjacent monomer units are oriented head-to-tail. In some embodiments, on average in provided polymer compositions, greater than about 90% of adjacent monomer units are oriented head-to-tail. In some embodiments, on average in provided polymer compositions, greater than about 95% of adjacent monomer units are oriented head-to-tail. In some embodiments, on average in provided polymer compositions, essentially all adjacent monomer units are oriented head-to-tail.

In those embodiments where structurally precise poly(propylene carbonate) of the present invention is characterized by a high percentage of carbonate linkages, polymers have on average greater than about 90% of adjacent monomer units connected via carbonate linkages and less than about 10% ether linkages. In certain embodiments, on average in provided polymer compositions, greater than about 95% of adjacent monomer units connected via carbonate linkages. In some embodiments, on average in provided polymer compositions, greater than about 97% of adjacent monomer units are connected via carbonate linkages. In some embodiments, on average in provided polymer compositions, greater than about 99% of adjacent monomer units are connected via carbonate linkages. In some embodiments, on average in provided polymer compositions, essentially all adjacent monomer units are connected via carbonate linkages. In certain embodiments, polymers may contain polyether portions formed in a separate process from the carbonate chains, and in such cases the ether linkages of the polyether portions are to be understood to be distinct from the ether linkages described above which typically arise from imperfect copolymerization of $CO_2$ and propylene oxide.

In those embodiments where structurally precise poly(propylene carbonate) of the present invention is characterized by a narrow polydispersity index, polymers have a PDI less than about 2. In certain embodiments, polymers have a PDI less than about 1.8. In some embodiments, polymers have a PDI less than about 1.5. In some embodiments, polymers have a PDI less than about 1.4, less than about 1.2 or less than about 1.1. In certain embodiments, polymers have a PDI between about 1.0 and about 1.2.

In those embodiments where structurally precise poly(propylene carbonate) of the present invention is characterized by a low cyclic carbonate content, polymers have a cyclic carbonate content less than about 5%. In certain embodiments, polymers contain less than 5% propylene carbonate. In some embodiments, polymers contain less than 3% propylene carbonate. In some embodiments, polymers contain less than 1% propylene carbonate. In certain embodiments, polymers contain essentially no propylene carbonate.

In some embodiments, structurally precise poly(propylene carbonate) compositions of the present invention are characterized in that they possess a combination of two or more characteristics selected from the group consisting of: a high head-to-tail ratio; a high percentage of carbonate linkages; a narrow polydispersity index; and a low cyclic carbonate content. In some embodiments, poly(propylene carbonate) is characterized in that it has a combination of a high head-to-tail ratio and a high percentage of carbonate linkages. In some embodiments, poly(propylene carbonate) is characterized in that it has a combination of a high head-to-tail ratio and a narrow polydispersity index. In some embodiments, poly(propylene carbonate) is characterized in that it has a combination of a high head-to-tail ratio and a low cyclic carbonate content. In some embodiments, poly(propylene carbonate) is characterized in that it has a combination of a narrow polydispersity index and high percentage of carbonate linkages. In some embodiments, poly(propylene carbonate) is characterized in that it has a combination of a high head-to-tail ratio, a high percentage of carbonate linkages, and a narrow polydispersity index.

Structurally precise poly(propylene carbonate) compositions of the present invention can have a range of molecular weights. For specific applications it may be desirable to use a higher or lower molecular weight material to obtain the optimum combination of performance and processing characteristics. Such selection processes are well known to the skilled artisan. The molecular weight of the polymer can be represented by the molecular weight number (Mn). High molecular weight PPC as described herein generally has an Mn greater than about $5 \times 10^4$ g/mol. Low molecular weight PPC as described herein has an Mn between about $1 \times 10^3$ and about $5 \times 10^4$ g/mol.

In certain embodiments, poly(propylene carbonate) compositions of the present invention are thermoplastics having a relatively high Mn. In certain embodiments, structurally precise thermoplastic poly(propylene carbonate) of the present invention has an Mn above about $5 \times 10^4$ g/mol. In certain embodiments, poly(propylene carbonate) of the present invention has an Mn above about $1 \times 10^5$ g/mol. In certain embodiments, poly(propylene carbonate) of the present invention has an Mn between about $5 \times 10^4$ g/mol and about $2 \times 10^7$ g/mol.

In certain embodiments, the invention encompasses structurally precise poly(propylene carbonate) having a molecular weight between about 40,000 and about 400,000 g/mol. In certain embodiments, the invention encompasses structurally precise poly(propylene carbonate) having a molecular weight between about 50,000 and about 350,000 g/mol. In certain embodiments, the invention encompasses structurally precise poly(propylene carbonate) having a molecular weight between about 100,000 and about 300,000 g/mol. In certain embodiments, the Mn is in the range of about 150,000 and about 250,000 g/mol. In some embodiments, structurally precise poly(propylene carbonate) compositions of the present invention have an Mn between about 160,000 and about 240,000 g/mol. In certain embodiments, the poly(propylene carbonate) compositions of the present invention have an Mn between about 180,000 and about 220,000 g/mol. In certain embodiments, poly(propylene carbonate) compositions of the present invention have an Mn of about 180,000.

In certain embodiments, structurally precise poly(propylene carbonate) of the present invention has the following combination of properties: an Mn in the range of about 60,000 to about 400,000; a carbonate linkage content above 95%; a head-to-tail ratio greater than about 85%; a polydispersity index less than about 1.5, and a cyclic carbonate content below about 5%.

In some embodiments, structurally precise poly(propylene carbonate) of the present invention has the following combination of properties: an Mn in the range of about 60,000 to about 100,000; a carbonate linkage content above 95%; a head-to-tail ratio greater than about 85%; a polydispersity index less than about 1.5, and a cyclic carbonate content below about 5%.

In certain embodiments, structurally precise poly(propylene carbonate) of the present invention has the following combination of properties: an Mn of about 80,000; a carbonate linkage content above 98%; a head-to-tail ratio greater than about 85%; a polydispersity index less than about 1.2, and a cyclic carbonate content below about 2%.

In some embodiments, structurally precise poly(propylene carbonate) of the present invention has the following combination of properties: an Mn in the range of about 120,000 to about 250,000; a carbonate linkage content above 95%; a head-to-tail ratio greater than about 85%; a polydispersity index less than about 1.5, and a cyclic carbonate content below about 5%.

In certain embodiments, structurally precise poly(propylene carbonate) of the present invention has the following combination of properties: an Mn of about 180,000; a carbonate linkage content above 98%; a head-to-tail ratio greater than about 85%; a polydispersity index less than about 1.2, and a cyclic carbonate content below about 2%.

In some embodiments, provided structurally precise poly(propylene carbonate) possesses some degree of stereoregularity. In some embodiments, PPC is at least partially isotactic. In some embodiments, PPC is at least partially syndiotactic. In certain embodiments, PPC is substantially isotactic. In some embodiments, PPC is a blend of atactic PPC with isotactic or syndiotactic PPC.

In certain embodiments, structurally precise PPC of the present invention comprises a blend of two or more PPC compositions characterized in that each PPC composition in the blend has a different average molecular weight. In certain embodiments, a blend of the present invention comprises a blend of high molecular weight PPC having an Mn between about 150,000 and about 400,000 g/mol with a lower molecular weight PPC having an Mn below about 100,000 g/mol. In certain embodiments, a blend of the present invention comprises a blend of high molecular weight PPC having an Mn between about 150,000 and about 250,000 g/mol with a lower molecular weight PPC having an Mn between about 30,000 g/mol and about 80,000 g/mol. In certain embodiments, each component of such blends has a narrow polydispersity. In certain embodiments, the PDI of the high molecular weight and low molecular weight components of a blend are each less than 1.2 when measured independently. In certain embodiments, such blends are produced by mixing discrete samples of PPC polymer having low and high molecular weights.

In certain embodiments, structurally precise poly(propylene carbonate) of the present invention has a glass transition temperature (Tg) above 40° C. In certain embodiments, structurally precise poly(propylene carbonate) of the present invention has a glass transition temperature (Tg) above 41° C. In certain embodiments, structurally precise poly(propylene carbonate) of the present invention has a glass transition temperature (Tg) above 42° C. In certain embodiments, structurally precise poly(propylene carbonate) of the present invention has a glass transition temperature (Tg) above 43° C. In certain embodiments, structurally precise poly(propylene carbonate) of the present invention has a glass transition temperature (Tg) above 44° C. In certain embodiments, structurally precise poly(propylene carbonate) of the present invention has a glass transition temperature (Tg) above 45° C.

In certain embodiments, structurally precise poly(propylene carbonate) compositions of the present invention are formed using catalysts other than zinc-containing catalysts. In certain embodiments, the structurally precise polymers contain no detectable zinc residue.

In accordance with the present invention, aliphatic polycarbonates suitable for embodiments of the present invention can be obtained by copolymerization of epoxides and carbon dioxide in the presence of transition metal catalysts. In certain embodiments, structurally precise poly(propylene carbonate) compositions of the present invention are formed using metal salen catalysts. In certain embodiments, the structurally precise poly(propylene carbonate) compositions of the present invention are formed using cobalt salen catalysts. Suitable catalysts and methods include those described in U.S. Pat. No. 7,304,172 and in published PCT Application No. WO/2010/022388A2 the entire content of each of which is incorporated herein by reference.

In some embodiments, provided structurally precise poly(propylene carbonate) compositions comprise polymer chains having a structure represented by formula I:

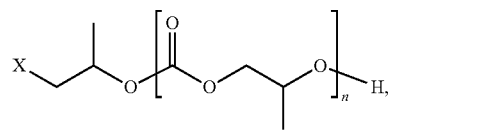

where X is a moiety corresponding to the bound form of any nucleophile that can ring-open an epoxide and n is an integer from about 10 to about 40,000. In certain embodiments, X in structure I is selected from the group consisting of halide, azide, or an optionally substituted group consisting from the group of carboxylate, sulfonate, phenol, and alkoxide. In some embodiments, n is from about 50 to about 3,000.

In certain embodiments, structurally precise polymers of the present invention are present as a mixture of two or more different polymer chain types, wherein the different chain types are distinguished by the presence of two or more different chain terminating groups and/or the presence, absence or differences in small molecule polymer initiation molecules embedded within the polymer chain.

In certain embodiments, structurally precise poly(propylene carbonate) composition is characterized in that it includes two polymer chain types, A and B wherein the types differ in their terminating groups. In certain embodiments, polymer chain types A and B have the following formulae:

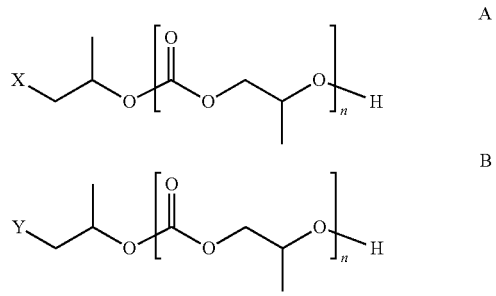

wherein n is as defined above, —X and —Y each represent a nucleophile that can ring-open an epoxide, and where —X and —Y are different.

In certain embodiments, X and Y are independently selected from the group consisting of halide, azide, or an optionally substituted group selected from the group consisting of carboxylate, sulfonate, phenol, and alkoxide. In certain embodiments, X is a halide and Y is an optionally substituted group selected from the group consisting of carboxylate, sulfonate, phenol, and alkoxide. In certain embodiments, X is a halide and Y is a carboxylate. In certain embodiments, X is chloride and Y is a carboxylate. In certain embodiments, X is chloride and Y is selected from the group consisting of: formate, acetate, benzoate, trifluoroacetate, and pentafluorobenzoate. In certain embodiments, X is chloride and Y is trifluoroacetate (shown below as structures A² and B²).

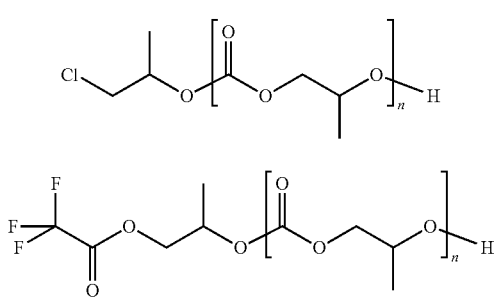

wherein n is as defined above.

In certain embodiments, the ratio between chain types A and B ranges from about 1:3 to about 3:1. In certain embodiments, the ratio between chain types A and B ranges from about 1:2 to about 2:1. In certain embodiments, structurally precise poly(propylene carbonate) compositions of the present invention include an approximately equimolar mixture of chain types A and B. In certain embodiments, structurally precise poly(propylene carbonate) compositions of the present invention include an approximately equimolar mixture of chain types A² and B².

In certain embodiments, structurally precise poly(propylene carbonate) compositions comprise chains of type C:

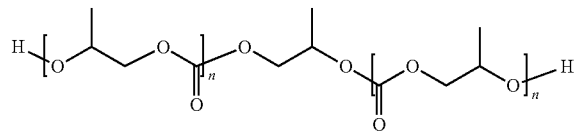

wherein each n is independently as defined above.

In certain embodiments, the structurally precise poly(propylene carbonate) compositions include chains of type C in combination with chains of types A or A and B. In certain embodiments, the ratio of chains of type C to chains of types A or A and B ranges (e.g. the ratios C:A or C:[A+B]) from about 0.1:1 to about 100:1. In certain embodiments, this ratio is between about 1:1 and about 10:1. In certain embodiments, this ratio is between about 2:1 and about 5:1.

In some embodiments, structurally precise poly(propylene carbonate) compositions include chains of type D which have a polymer initiation moiety embedded within them. In certain embodiments, an embedded polymer initiation moiety is located approximately in the center of the polycarbonate chains (in other words, the moiety is linked to two or more poly(propylene carbonate) chains where statistically each chain is of approximately equal length). In certain embodiments, chains of type D are linear polymer chains with two polycarbonate chains linked to an embedded polymer initiation moiety. In certain embodiments, chains of type D are star polymers with three or more polycarbonate chains linked to an embedded polymer initiation moiety.

In certain embodiments, chains of type D have a formula $D^1$:

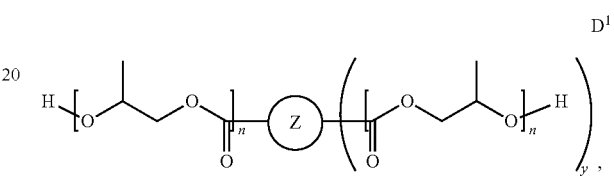

wherein each n is independently as defined above, y is an integer from 1 to 5 indicating how many additional individual polycarbonate chains are linked to the embedded polymer initiation moiety (e.g. the total number of poly(propylene carbonate) chains linked to the embedded polymer initiation moiety ranges from 2 to 6); and where Z is any polyfunctional molecule that can react with carbon dioxide at two or more sites to initiate a polymer chain (e.g. to form a carbonate, carbamate, thiocarbonate, or ester from an oxygen, nitrogen, sulfur, or carbon nucleophile respectively). In certain embodiments, the value of y for polymers of type $D^1$ is 1. In certain embodiments, the value of y for polymers of type $D^1$ is 2. In certain embodiments, the value of y for polymers of type $D^1$ is 3.

In some embodiments, chains of type D have a formula $D^2$:

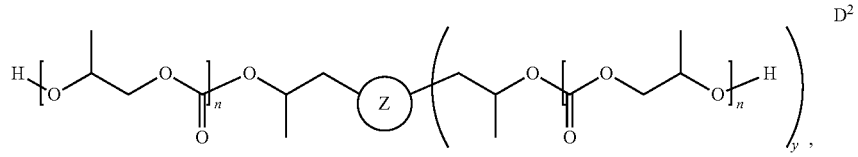

where each n is independently as defined above, y is an integer from 1 to 5 indicating how many additional individual polycarbonate chains are linked to the embedded polymer initiation moiety (e.g. the total number of polypropylene carbonate) chains linked to the embedded polymer initiation moiety ranges from 2 to 6); and where Z is any polyfunctional molecule that can react at two or more sites with an epoxide to initiate formation of a polycarbonate chain (e.g. by an oxygen, nitrogen, sulfur, or carbon nucleophile respectively to form an ether, amine, thioether, or carbon-carbon bond, respectively). In certain embodiments, the value of y for polymers of type $D^2$ is 1. In certain embodiments, the value of y for polymers of type $D^2$ is 2. In certain embodiments, the value of y for polymers of type $D^2$ is 3.

In some embodiments, chains of type D have a formula $D^3$:

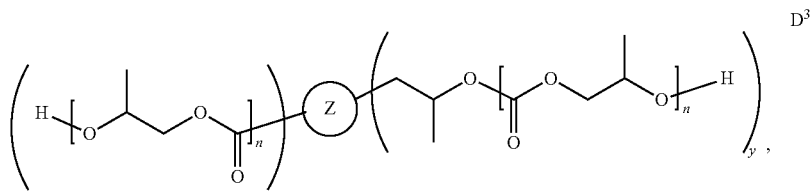

where each n is independently as defined above, y and y' are each independently an integer from 0 to 6 and the sum of y and y' is at least 2; and where Z is any polyfunctional molecule that can react at two or more sites with carbon dioxide or an epoxide to initiate formation of polycarbonate chains as described above for structures $D^1$ and $D^2$, respectively. In certain embodiments, the value of y' for polymers of type $D^3$ is 2. In certain embodiments, the value of y for polymers of type $D^3$ is 2. In certain embodiments, for polymers of type $D^3$ the value of one of y or y' is 2 and the value of the other is 0. In some embodiments, the sum of y and y' is greater than 2.

In certain embodiments, structurally precise poly(propylene carbonate) compositions of the present invention contain chains of formula A and chains of formula $D^3$ in a ratio from about 1:50 to about 50:1. In certain embodiments the ratio of chains of formula A to chains of formula $D^3$ ranges from about 1:50 to about 1:1. In certain embodiments the ratio of chains of formula A to chains of formula $D^3$ ranges from about 1:10 to about 10:1. In certain embodiments the ratio of chains of formula A to chains of formula $D^3$ ranges from about 1:2 to about 2:1.

In certain embodiments, structurally precise poly(propylene carbonate) compositions of the present invention contain at least 0.1% of chains $D^3$ where the sum of y and y' is greater than 2. In certain embodiments, structurally precise poly(propylene carbonate) compositions of the present invention contain at least 0.5% and 20% of chains $D^3$ where the sum of y and y' is greater than 2.

In certain embodiments, structurally precise poly(propylene carbonate) compositions of the present invention include chains of type D along with chains of type A. In certain embodiments, structurally precise poly(propylene carbonate) compositions of the present invention include chains of type D along with a mixture of chains of types A and B. In certain embodiments, structurally precise poly(propylene carbonate) compositions of the present invention include chains of type D along with chains of type C, and optionally also containing chains of types A or a mixture of types A and B.

In certain embodiments, polymers of the present invention include chains of type $D^1$ wherein the embedded chain transfer moiety is a bound form of ethylene glycol (e.g. where Z is —$OCH_2CH_2O$—) and the resulting polymer chains have the formula $D^4$:

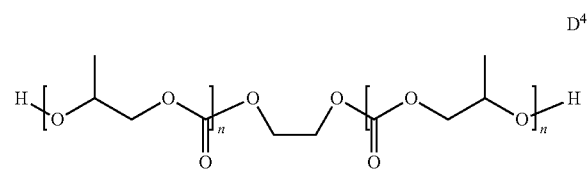

where each n is independently as defined above.

In certain embodiments, provided PPC compositions have approximately 10 to 90% of the chains with structure $D^4$ with the balance made up of chains of structures A, B, or C or mixtures of two or more of these.

In certain embodiments, polymers of the present invention include chains of type $D^1$ wherein the embedded chain transfer moiety is a bound form of dipropylene glycol (which may be a mixture of isomers) and the resulting polymer chains have the formula $D^5$:

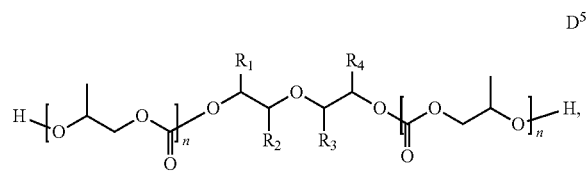

where each n is independently as defined above, one of $R_1$ and $R_2$ is methyl and the other is hydrogen and one of $R_3$ and $R_4$ is methyl and the other is hydrogen (e.g. Z in formula $D^1$ has one of the following structures:

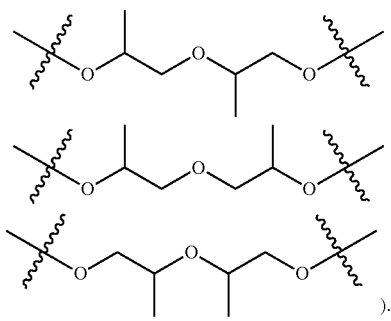

).

In certain embodiments, PPC compositions have approximately 10 to 90% of the chains with structure $D^5$ with the balance made up of chains of structures A, B, or C or mixtures of two or more of these.

In certain embodiments, polymers of the present invention include chains of type $D^1$ wherein the embedded chain transfer moiety is a bound form of 1,3 propane diol (e.g. where Z is —$OCH_2CH_2CH_2O$—) and the resulting polymer chains have the formula $D^6$:

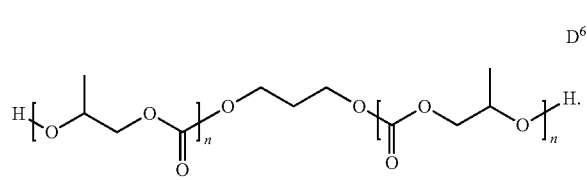

wherein each n is independently as defined above.

In certain embodiments, PPC compositions have approximately 10 to 90% of the chains with structure $D^6$ with the balance made up of chains of structures A, B, or C or mixtures of two or more of these.

In certain embodiments, polymers of the present invention include chains of type $D^3$ wherein the embedded chain transfer moiety is a bound form of glycolic acid and the resulting polymer chains have the formula $D^7$:

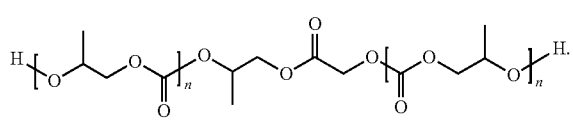 

In certain embodiments, provided PPC compositions have approximately 10 to 90% of the chains with structure $D^7$ with the balance made up of chains of structures A, B, or C or mixtures of two or more of these.

In certain embodiments, polymers of the present invention include chains of type $D^3$ wherein the embedded chain transfer moiety is a bound form of propoxylated glycerol and the resulting polymer chains have the formula $D^8$:

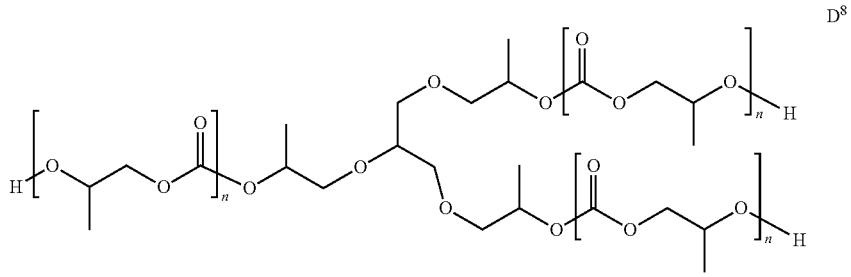

where each n is independently as defined above.

In certain embodiments, provided PPC compositions have approximately 10 to 90% of the chains with structure $D^9$ with the balance made up of chains of structures A, B, or C or mixtures of two or more of these.

In certain embodiments, polymers of the present invention include chains of type $D^3$ wherein the embedded chain transfer moiety is a bound form of propoxylated pentaerythritol and the resulting polymer chains have the formula $D^9$:

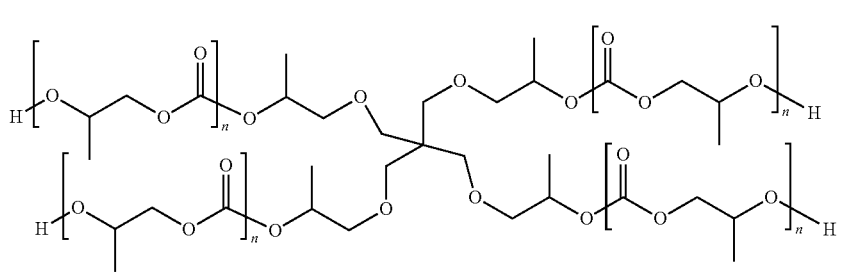

wherein each n is independently as defined above.

In certain embodiments, provided PPC compositions have approximately 10 to 90% of the chains with structure $D^9$ with the balance made up of chains of structures A, B, or C or mixtures of two or more of these.

In certain embodiments, polymers of the present invention include chains of type $D^3$ wherein the embedded chain transfer moiety is a bound form of polyethylene glycol or polypropylene glycol and the resulting polymer chains have the formula $D^{10}$:

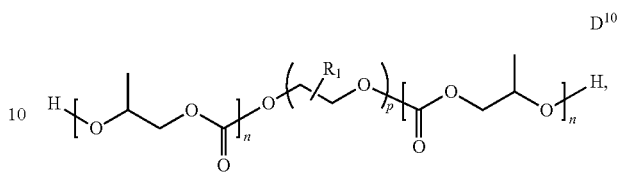

wherein each n is independently as defined above, p is an integer from 2 to 200 inclusive; and $R^1$ is optionally present, and if present is methyl.

In certain embodiments, provided PPC compositions have approximately 10 to 90% of the chains with structure $D^{10}$ with the balance made up of chains of structures A, B, or C or mixtures of two or more of these.

In certain embodiments, the polymers of the present invention include chains of type $D^3$ wherein the embedded chain transfer moiety is a bound form of an optionally unsubstituted diacid. In certain embodiments the diacid is a straight chain saturated diacid and the resulting polymer chains have the formula $D^{11}$:

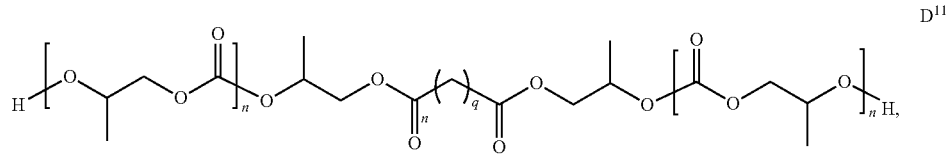

wherein each n is independently as defined above, and q is an integer from 0 to 32 inclusive.

In certain embodiments, provided PPC compositions have approximately 10 to 90% of the chains with structure $D^{11}$ with the balance made up of chains of structures A, B, or C or mixtures of two or more of these.

In certain embodiments, polymers of the present invention include two or more varieties of chains of type D differentiated from each other by the identity of the embedded chain transfer moiety. In certain embodiments, structurally precise poly(propylene carbonate) compositions of the present invention include polymer chains of type $D^4$ along with one or more additional different chain D types. In certain embodiments, structurally precise poly(propylene carbonate) compositions of the present invention include polymer chains of type $D^5$ along with one or more additional different chain D types. In certain embodiments, structurally precise poly(propylene carbonate) compositions of the present invention include polymer chains of type $D^6$ along with one or more additional different chain D types. In certain embodiments, structurally precise poly(propylene carbonate) compositions of the present invention include polymer chains of type $D^7$ along with one or more additional different chain D types. In certain embodiments, structurally precise poly(propylene carbonate) compositions of the present invention include polymer chains of type $D^8$ along with one or more additional different chain D types. In certain embodiments, structurally precise poly(propylene carbonate) compositions of the present invention include polymer chains of type $D^9$ along with one or more additional different chain D types.

In certain embodiments, structurally precise poly(propylene carbonate) compositions of the present invention include polymer chains of type C along with chains of type D. In certain embodiments, structurally precise poly(propylene carbonate) compositions of the present invention include polymer chains of type C along with chains of type $D^4$. In certain embodiments, structurally precise poly(propylene carbonate) compositions of the present invention include polymer chains of type C along with chains of type $D^5$. In certain embodiments, structurally precise poly(propylene carbonate) compositions of the present invention include polymer chains of type C along with chains of type $D^6$. In certain embodiments, structurally precise poly(propylene carbonate) compositions of the present invention include polymer chains of type C along with chains of type $D^7$. In certain embodiments, structurally precise poly(propylene carbonate) compositions of the present invention include polymer chains of type C along with chains of type $D^8$. In certain embodiments, structurally precise poly(propylene carbonate) compositions of the present invention include polymer chains of type C along with chains of type $D^9$. In certain embodiments, structurally precise poly(propylene carbonate) compositions of the present invention include polymer chains of type A along with chains of types C and D. In certain embodiments, structurally precise poly(propylene carbonate) compositions of the present invention include polymer chains of type A and B along with chains of types C and D.

In certain embodiments, structurally precise poly(propylene carbonate) compositions of the present invention include chains of type C along with chain types A or A and B. In certain embodiments, structurally precise poly(propylene carbonate) compositions of the present invention include predominantly chains of type C along with lesser amounts of chain types A or A and B. In certain embodiments, structurally precise poly(propylene carbonate) compositions of the present invention include a majority (e.g. >50%, >60%, >70%, >80%, or >90%) of chains of type C along with lesser amounts of chains of type A. In certain embodiments, structurally precise poly(propylene carbonate) compositions of the present invention include a majority (e.g. >50%, >60%, >70%, >80%, or >90%) of chains of type C along with lesser amounts of a mixture of chains of types A and B. In certain embodiments, structurally precise poly(propylene carbonate) compositions of the present invention include a majority (e.g. >50%, >60%, >70%, >80%, or >90%) of chains of types C and D along with lesser amounts of a mixture of chains of types A and B.

In some embodiments, structurally precise poly(propylene carbonate) compositions of the present invention include about 30 to 80% of polymer chains selected from chains of structure C and D or a mixture of C and D, and 20 to 70% of chains selected from structures A, B, or a mixture of A and B.

In certain embodiments, PPC compositions of the present invention have equal proportions of $A^2$ and $B^2$ (e.g. a 1:1 ratio between $A^2$ chains and $B^2$ chains) along with any proportion of one or more chain types C and/or D. In certain embodiments, PPC compositions of the present invention contain about equal proportions of four chain types having structures $A^2$, $B^2$, C, and $D^4$. In certain embodiments, PPC compositions of the present invention have approximately equal proportions of $A^2$ $B^2$ and $D^4$ (e.g. approximately a 1:1:1 ratio between $A^2$ chains $B^2$ chains and $D^4$ chains) along with any proportion of chains type C. In certain embodiments, PPC compositions of the present invention contain approximately 10 to 90% of each of chain types $A^2$, $B^2$, C and $D^4$.

In certain embodiments, PPC compositions of the present invention have approximately equal proportions of $A^2$, $B^2$ and $D^5$ (e.g. approximately a 1:1:1 ratio between $A^2$ chains $B^2$ chains and $D^5$ chains) along with any proportion of chains type C. In certain embodiments, PPC compositions of the present invention contain approximately 10 to 90% of each of chain types $A^2$, $B^2$, C and $D^5$.

In certain embodiments, PPC compositions of the present invention have approximately equal proportions of $A^2$, $B^2$ and $D^6$ (e.g. approximately a 1:1:1 ratio between $A^2$ chains $B^2$ chains and $D^6$ chains) along with any proportion of chains type C. In certain embodiments, PPC compositions of the present invention contain approximately 10 to 90% of each of chain types $A^2$, $B^2$, C and $D^6$.

In certain embodiments, PPC compositions of the present invention have approximately equal proportions of $A^2$, $B^2$ and $D^7$ (e.g. approximately a 1:1:1 ratio between $A^2$ chains $B^2$ chains and $D^7$ chains) along with any proportion of chains type C. In certain embodiments, PPC compositions of the present invention contain approximately 10 to 90% of each of chain types $A^2$, $B^2$, C and $D^7$.

In certain embodiments, PPC compositions of the present invention have approximately equal proportions of $A^2$, $B^2$ and $D^8$ (e.g. approximately a 1:1:1 ratio between $A^2$ chains $B^2$ chains and $D^8$ chains) along with any proportion of chains type C. In certain embodiments, PPC compositions of the present invention contain approximately 10 to 90% of each of chain types $A^2$, $B^2$, C and $D^8$.

In certain embodiments, PPC compositions of the present invention have approximately equal proportions of $A^2$, $B^2$ and $D^9$ (e.g. approximately a 1:1:1 ratio between $A^2$ chains $B^2$ chains and $D^9$ chains) along with any proportion of chains type C.

In certain embodiments, PPC compositions of the present invention contain approximately 10 to 90% of each of chain types $A^2$, $B^2$, C and $D^9$. In certain embodiments, PPC compositions of the present invention have approximately equal proportions of $A^2$, $B^2$ and $D^{10}$ (e.g. approximately a 1:1:1 ratio between $A^2$ chains $B^2$ chains and $D^{10}$ chains) along with any proportion of chains type C. In certain embodiments, PPC compositions of the present invention contain approximately 10 to 90% of each of chain types $A^2$, $B^2$, C and $D^{10}$.

In certain embodiments, PPC compositions of the present invention have approximately equal proportions of $A^2$, $B^2$ and $D^{11}$ (e.g. approximately a 1:1:1 ratio between $A^2$ chains $B^2$ chains and $D^{11}$ chains) along with any proportion of chains type C. In certain embodiments, PPC compositions of the present invention contain approximately 10 to 90% of each of chain types $A^2$, $B^2$, C and $D^{11}$.

In certain embodiments, where structurally precise PPC compositions of the present invention include two or more chain types (e.g. any of structures A through $D^{11}$), the value of n at each occurrence is approximately the same.

In certain embodiments, any of the structures A through $D^{11}$ described above may be modified. In certain embodiments, this may be done by performing chemistry post-polymerization on the terminal hydroxyl group(s). In certain embodiments, the compositions of the present invention encompass polymers containing chains of type A through $D^{11}$ wherein the terminating groups are esters, ethers, carbamates, sulfonates, or carbonates. In certain embodiments, these derivatives may be formed by reaction with acylating agents to provide groups such as acetate, trifluoroacetate, benzoate or pentafluorobenzoate. In embodiments, hydroxyl groups may be reacted with isocyanates to form carbamates, with silyl halides or silyl sulfonates to form silyl ethers, with alkyl halides or alkyl sulfonates to form ethers, or with sulfonyl halides or anhydrides to form sulfonates.

In some embodiments, structurally precise poly(propylene carbonate) compositions of the present invention are crystallizable. In certain embodiments, the structurally precise poly(propylene carbonate) compositions of the present invention crystallize to provide a semi-crystalline thermoplastic polymer having a melting point. In some embodiments, the melting point of such poly(propylene carbonate) is in the range of from about 100° C. to about 160° C. In certain embodiments, the melting point of structurally precise poly(propylene carbonate) is in the range of from about 110° C. to about 150° C. In certain embodiments, the melting point of structurally precise poly(propylene carbonate) is in the range of from about 120° C. to about 140° C. In certain embodiments, the melting point of structurally precise poly(propylene carbonate) is about 132° C.

In another aspect, the present invention encompasses blends of the above-described structurally precise poly(propylene carbonate) compositions with one or more additional polymers. In general for polymers described herein, blends may be prepared with other polymers, and such other polymers may be elastomers, thermoplastics or thermosets. Elastomers are generally polymers whose Tg (glass transition temperature) and Tm (melting point), if present, are below ambient temperature, usually considered to be about 20° C. Thermoplastics are those polymers whose Tg and/or Tm are at or above ambient temperature. Blends can be made by any of the common techniques known to the artisan, such as solution blending, or melt blending in a suitable apparatus such as a single or twin-screw extruder.

Blends may be made with almost any kind of elastomer, such as EP, EPDM, SBR, natural rubber, polyisoprene, polybutadiene, neoprene, butyl rubber, styrene-butadiene block copolymers, segmented polyester-polyether copolymers, elastomeric polyurethanes, chlorinated or chlorosulfonated polyethylene, (per)fluorinated elastomers such as copolymers of vinylidene fluoride, hexafluoropropylene, tetrafluoroethylene, copolymers of tetrafluoroethylene and perfluoro (methyl vinyl ether), and copolymers of tetrafluoroethylene and propylene.

Suitable thermoplastics useful for blending with the structurally precise polypropylene carbonate)s described herein include: polyesters such as poly(lactic acid) (PLA), poly(3-hydroxybutyrate) (P3HB), poly(4-hydroxybutyrate) (P4HB), poly(hydroxy valerate) (PHV), poly(3-hydroxy propionate) (P3HP), polyhydroxyoctanoate (PHO), poly(ethylene terephthalate), poly(butylene terephthalate), and poly(ethylene adipate); other polycarbonates such as aromatic polycarboantes, and other aliphatic polycarbonates such as poly(ethylene carbonate), poly(butylene carbonate), poly (cyclohexane carbonate), poly(limonene carbonate) and terpolymers of $CO_2$ and any two or more epoxides; polyamides such as nylon-6, nylon-6,6, nylon-12, nylon-12,12, nylon-11, and a copolymer of hexamethylene diamine, adipic acid and terephthalic acid; fluorinated polymers such as copolymers of ethylene and vinylidene fluoride, copolymers of tetrafluoroethylene and hexafluoropropylene, copolymers of tetrafluoroethylene and a perfluoro(alkyl vinyl ether) such as perfluoro(propyl vinyl ether), and poly(vinyl fluoride); other halogenated polymers such a poly(vinyl chloride) and poly(vinylidene chloride) and its copolymers; polyolefins such as polyethylene, polypropylene, polyvinyl alcohol, and polystyrene, and copolymers thereof; (meth)acrylic polymers such a poly(methyl methacrylate) and copolymers thereof; copolymers of olefins such as ethylene with various (meth) acrylic monomers such as alkyl acrylates, (meth)acrylic acid and ionomers thereof, and glycidyl (meth)acrylate); aromatic polyesters such as the copolymer of Bisphenol A and terephthalic and/or isophthalic acid; and liquid crystalline polymers such as aromatic polyesters or aromatic poly(ester-amides). Other suitable blending polymers include polyethers such as polyethylene glycol, polypropylene glycol, polyether ether ketone, poly(tetramethylene ether) glycol, polyphenyl ether, and polyoxymethylene.

Suitable thermosets for blending with the polymers described herein include epoxy resins, phenol-formaldehyde resins, melamine resins, and unsaturated polyester resins (sometimes called thermoset polyesters). In some embodiments, blending with thermoset polymers will be done before the thermoset is crosslinked, using standard techniques.

In some embodiments, polymers described herein are blended with uncrosslinked polymers which are not usually considered thermoplastics for various reasons, such as excessive viscosity and/or a melting point so high the polymer decomposes below the melting temperature. Such polymers include poly(tetrafluoroethylene), aramids such as poly(p-phenylene terephthalate) and poly(m-phenylene isophthalate), liquid crystalline polymers such as poly(benzoxazoles), and non-melt processible polyimides such as aromatic polyimides.

All of the polymers disclosed herein may optionally be mixed with various additives normally added to elastomers and thermoplastics [see, for example Encyclopedia of Polymer Science and Engineering, 2nd Ed. vol. 14, p. 327-410]. For instance reinforcing, non-reinforcing and conductive fillers, such as carbon black, glass fiber, organic materials such as starch and wood flour, minerals such as clay, mica and talc, glass spheres, barium sulfate, zinc oxide, carbon fiber, and aramid fiber or fibrids, may be used. Antioxidants, antiozonants, pigments, dyes, delusterants, compounds to promote crosslinking may be added. Plasticizers such as various hydrocarbon oils may also be used. In some embodiments, the invention encompasses PPC containing nanoparticles, or nanomaterials. Nano materials such as carbon nano-tubes, Fullerenes, graphene, buckyballs, quantum dots, colloidal metals such as silver and gold and platinum, iron or other metal nano particles or other non-carbon nanoparticles may also be incorporated into the structurally-precise PPC compositions.

In one aspect, the present invention encompasses consumer packaging articles made from, containing, or coated with the structurally precise PPC or PPC blends described hereinabove. Representative applications of polymers in packaging and concepts related thereto are described in Plastics Packaging: Properties, Processing, Applications, And Regulations by Susan E. M. Selke (Hanser Gardner Publications; 2 edition (Dec. 1, 2004) ISBN 978-1569903728), the entirety of which is incorporated herein by reference.

In one aspect, the present invention encompasses films containing poly(propylene carbonate). In some embodiments, films are blow-molded films, cast films or extruded films. In certain embodiments, films are rigid films, stretch films, or heat-shrinkable films. The manufacturing techniques to produce such films are well known to the skilled artisan. Structurally precise poly(propylene carbonate) compositions described hereinabove can be incorporated into such film forming processes as blends with other film-forming polymers or as neat materials.

Poly(propylene carbonate) compositions or blends described herein are useful for blown or cast films or as sheet materials (see Encyclopedia of Polymer Science and Technology, 1st Ed., vol. 7 p. 88-106; Kirk-Othmer Encyclopedia of Chemical Technology, 4th Ed., vol. 11, p. 843-856; Plastics Materials, 5 Ed., Butterworth-Heinemann, 252 and p. 432ff). The films may be single layer or multilayer, the multilayer films may include other polymers, adhesives, etc. For packaging the films may be stretch-wrap, shrink-wrap or cling wrap. Films are useful form many applications such as agricultural films, packaging foods.

Extruded films may be formed from these poly(propylene carbonate) compositions or blends described herein and these films may be treated, for example drawn or stretched. In some embodiments, such films are biaxially stretched. Such extruded films are useful for packaging of various sorts.

In certain embodiments, films of the present invention contain poly(propylene carbonate) as a component of a multilayer film. In certain embodiments, poly(propylene carbonate) acts as a tie layer in a laminate film. In some embodiments, a poly(propylene carbonate) composition provides a structural layer in a multilayer film. In certain embodiments, films of the present invention are biodegradable films. In some embodiments, such films comprise a poly(propylene carbonate) composition in combination with one or more other degradable polymers as starch, PHB, 3PHP, PLA, or modified cellulose. In certain embodiments, the layer containing the poly(propylene carbonate) composition acts as a barrier layer to retard the transmission of oxygen, water vapor, carbon dioxide, or organic molecules.

In some embodiments, poly(propylene carbonate)-containing films of the present invention are used for packaging applications. In certain embodiments, films of the present invention are used for packaging food items, either in a food-contact situation or as a secondary packaging material. In certain embodiments, poly(propylene carbonate)-containing films of the present invention are used as retail packaging for consumer products. In certain applications poly(propylene carbonate)-containing films of the present invention are used to make bubble-wrap, or other similar packing materials. In certain embodiments poly(propylene carbonate)-containing films of the present invention are used as substrates for adhesive tape.

In some embodiments, poly(propylene carbonate)-containing films of the present invention are used as agricultural film. In some applications such films are used as ground mulch. In certain embodiments ground mulches containing PPC of the present invention are degradable and may be plowed into the soil after use. In some embodiments, poly(propylene carbonate)-containing films of the present invention are used as greenhouse covering materials. In certain embodiments, provided PPC compositions are used as permeable or impermeable row covering materials. In certain embodiments, provided PPC compositions are used as geomembranes and pond liners.

In certain embodiments, poly(propylene carbonate)-containing films of the present invention are used one or more layers in multilayer constructions. In some embodiments, the films are used as a component in a multilayer packaging article such as a beverage bottle. In some embodiments, such multilayer bottles are formed by blow-molding. In other embodiments, PPC compositions of the present invention are used in the inner layer for paper-based liquid packaging articles such as juice boxes, milk cartons and gable top boxes. In certain embodiments, the films are used in 'bag-in-a-box' constructions. In certain applications the films are used in container closure construction such as collar wrappers, cap liners or lid membranes.

In certain embodiments, the invention encompasses flexible pouches made from a single layer or multilayer film as described above. Such pouches can be used for packaging various liquid products such as milk, or powders such as hot chocolate mix. The pouch may be heat sealed. It may also have a barrier layer, such as a metal foil layer.

In some embodiments, the present invention encompasses a wrap packaging film containing poly(propylene carbonate). In some embodiments, the films have differential cling. Such a film can be provided by a film laminate, including at least two layers; an outer reverse which is a poly(propylene carbonate) compositions or a blend thereof) described herein, which contains a tackifier in sufficient amount to impart cling properties; and an outer obverse which has little or no cling.

In another aspect, the present invention encompasses articles in which a poly(propylene carbonate) composition of the present invention is used as a coating. In examples of this aspect, poly(propylene carbonate) compositions of the present invention may be used in applications including, but not limited to: moisture resistant coatings for paper or other hydrophilic materials, heat seal coatings, printing inks, overprint coatings, barrier coatings, primer coatings, release coatings, anti-fog coatings, and antistatic coatings. In certain embodiments, poly(propylene carbonate) compositions of the present invention are used as coatings in applications for contact with solvents, fuels, lubricants or other organic liquids or vapors. In certain embodiments, poly(propylene carbonate) compositions of the present invention are used as coatings on containers for food or beverages. In some embodiments, the invention encompasses such coated food and beverage containers.

By coating metal foils such as aluminum foil with the poly(propylene carbonate) compositions or blends described herein, heat sealing can be achieved while maintaining excellent barrier properties. In some embodiments, the invention encompasses such poly(propylene carbonate)-coated metal foils.

In heat seal applications, poly(propylene carbonate) compositions of the present invention may be used for such applications as lidstock (for example in packaging dairy products, dry goods, medical supplies and liquid fill containers); as overwraps for items such as soap, cigarettes, paper goods, and other consumer products; as overlays in labeling applications; and in blister pack construction.

The following listing is of some uses for poly(propylene carbonate) compositions and poly(propylene carbonate) blends described herein. In some cases a reference is given which discusses such uses for specific polymers other than poly(propylene carbonate) or for polymers in general. In these cases, the concepts described therein are sufficiently general that the skilled practitioner may apply the concepts and techniques to applications of the instant poly(propylene carbonate) compositions without undue experimentation. The entirety of each of these references is incorporated herein by reference. For the references, these include: W. Gerhartz, et al., Ed., Ullmann's Encyclopedia of Industrial Chemistry, 5th Ed. VCH Verlagsgesellschaft mBH, Weinheim, for which the volume and page number are given below; H. F. Mark, et al., Ed., Kirk-Othmer Encyclopedia of Chemical Technology, 4th Ed., John Wiley & Sons, New York, J. I Kroschwitz, et al., Ed., for which the volume and page number are given below, Encyclopedia of Polymer Science and Technology, 1st Ed., John Wiley & Sons, New York, for which the volume and page number are given below, H. F. Mark, et al., Ed., Encyclopedia of Polymer Science and Engineering, 2nd Ed., John Wiley & Sons, New York, for which volume and page numbers are given below, and J. A. Brydson, ed., Plastics Materials, 5 Ed., Butterworth-Heinemann, Oxford, UK, 1989, and the page is given below.

In some embodiments, structurally precise PPC compositions of the present invention can act as tackifiers for low strength adhesives (Ullmann's Encyclopedia of Industrial Chemistry, 5th Ed. vol. A1, p. 235-236). Elastomeric blends and/or relatively low molecular weight poly(propylene carbonate) compositions are preferred for these applications. In some embodiments, the present invention encompasses a low strength adhesive containing a poly(propylene carbonate) composition or blend described hereinabove.

In some embodiments, structurally precise PPC compositions of the present invention can be useful as base resins for hot melt adhesives (Ullmann's Encyclopedia of Industrial Chemistry, 5th Ed. vol. A1, p. 233-234), pressure sensitive adhesives (ibid p. 235-236) or as solvent applied adhesives. Low to moderate molecular weight poly(propylene carbonate) and thermoplastic blends of poly(propylene carbonate) are preferred for hot melt adhesives. In some embodiments, the present invention encompasses hot melt adhesives containing a poly(propylene carbonate) composition or blend described hereinabove.

Other uses include polymer coatings and/or penetrants for the protection of various porous items such as lumber and masonry, particularly for items intended for use in outdoor settings. The poly(propylene carbonate) composition or blend for such applications can be provided in a suspension or emulsion, or may be dissolved in a solvent. In some embodiments, the present invention encompasses a weather-resistant coating containing a poly(propylene carbonate) composition or blend described hereinabove.

PPC compositions of the present invention can be used as the base polymer for caulking of various kinds. Lower molecular weight poly(propylene carbonate) or blends with elastomers may be used. In some embodiments, the present invention encompasses caulk containing a poly(propylene carbonate) composition or blend described hereinabove.

In certain embodiments, polymers may be reacted with various compounds particularly those that result in functional groups including, but not limited to epoxy, carboxylic anhydride (for instance reaction with maleic anhydride) an isocyanate or a carboxylic acid (Encyclopedia of Polymer Science and Technology, 1st Ed., vol. 12, p. 445). In certain embodiments, structurally-precise PPC compositions are modified via hydroxy groups present at the chain ends. Such functionalized polymers may be useful as tougheners for various thermoplastics and thermosets when blended. When polymers are elastomers, the functional groups which are grafted onto them may be used as curesites to crosslink the polymers. Maleic anhydride-grafted polymers are useful as tougheners for a wide range of materials (nylon, PPO, PPO/styrene alloys, PET, PBT, POM, PLA, PHB, etc.); as tie layers in multilayer constructs such as packaging barrier films; as hot melt, moisture-curable, and coextrudable adhesives; or as polymeric plasticizers. The maleic andhydride-grafted materials may be post-reacted with, for example; amines, to form other functional materials. Reaction with aminopropyl trimethoxysilane would allow for moisture-curable materials. Reactions with di- and tri-amines would allow for viscosity modifications.

In certain aspects, wire insulation and jacketing may be made from the poly(propylene carbonate) compositions or blends thereof (see Encyclopedia of Polymer Science and Engineering, 2nd Ed., vol. 17, p. 828-842). In the case of elastomers it may be preferable to crosslink the polymer after the insulation or jacketing is formed. In some embodiments, the present invention encompasses jacketing or insulation containing a poly(propylene carbonate) composition or blend described hereinabove.

Poly(propylene carbonate) compositions or blends thereof may be used as plasticizers or processing aids for other polymers including, but not limited to PLA, PHB, and PVC.

Poly(propylene carbonate) compositions or blends can be used as tougheners for other polymers such as PLA, PHB, and polyolefins. In some embodiments, the present invention encompasses PLA blended with a poly(propylene carbonate) composition or blend described hereinabove. In some embodiments, the present invention encompasses PHB blended with a poly(propylene carbonate) composition or blend described hereinabove. In some embodiments, the present invention encompasses starch blended with a poly(propylene carbonate) composition or blend described hereinabove.

Poly(propylene carbonate) compositions or blends herein can be used as drip suppressants to improve the flame-retardant properties of other polymers. Poly(propylene carbonate) compositions or blends described herein can be used to blend with candle wax, where they can provide smoke suppression and/or drip control. In some embodiments, the present invention encompasses candle wax containing a poly(propylene carbonate) composition or blend as described hereinabove. In another embodiment, the present invention encompasses candles containing a poly(propylene carbonate) composition or blend as described hereinabove.

Poly(propylene carbonate) compositions or blends described herein, especially those which are relatively flexible, are useful as capliner resins for carbonated and noncarbonated beverages.

Poly(propylene carbonate) compositions or blends described herein may be-used for extrusion or coextrusion coatings onto plastics, metals, textiles or paper webs.

Poly(propylene carbonate) compositions or blends described herein may be used as a laminating adhesive for glass. In some embodiments, the present invention encompasses laminated glass articles including poly(propylene carbonate) compositions or blends described herein used as a laminating adhesive.

Poly(propylene carbonate) compositions or blends described herein, especially those that are elastomeric, may be used in various types of hoses, such as automotive heater hose.

Poly(propylene carbonate) compositions or blends described herein, can act as compatibilizing agents between various other polymers.

Poly(propylene carbonate) compositions or blends described herein, can act as internal plasticizers for other polymers in blends. A polymer which may be plasticized is poly(vinyl chloride). In some embodiments, the invention encompasses PVC plasticized with the poly(propylene carbonate) compositions or blends described herein.

Poly(propylene carbonate) compositions or blends described herein can serve as adhesives between other polymers. In some embodiments, the invention encompasses such adhesives.

With the appropriate functional groups, poly(propylene carbonate) compositions described herein may serve as curing agents for other polymers with complimentary functional groups (i.e., the functional groups of the two polymers react with each other). In some embodiments, the invention encompasses such curable resins.

In some embodiments, the present invention encompasses polymer additives containing poly(propylene carbonate) compositions or blends described herein. In certain embodiments, the invention includes molding resins such as the so-called thermoplastic olefins to which PPC has been added, for example to improve paint adhesion, as in automotive uses.

In some embodiments, the present invention encompasses fibers containing poly(propylene carbonate) compositions or blends described herein. In some embodiments, the fibers are fine denier fibers and/or multifilaments. These may be melt spun. They may be in the form of a filament bundle, a non-woven web, a woven fabric, a knitted fabric or staple fiber. In another embodiment, the present invention encompasses fabrics, ropes, yarns or other finished fiber products containing structurally precise PPC as described hereinabove.

In some embodiments, the present invention encompasses foamed articles. The technology and methods for producing foamed products is well developed and the processes necessary to foam polymers of the present invention will be understood by the skilled artisan. Foamed articles of the invention include insulating materials, packaging materials, and food service containers. PPC and PPC blends can be foamed with known foaming agents such as HFCs, nitrogen and carbon dioxide. In certain embodiments, the invention encompasses environmentally benign packaging articles containing PPC foamed with carbon dioxide gas.

Foams containing polypropylene carbonate) compositions or blends described herein may be used to form flexible or rigid foamed objects, such as cores for various sports items such as surf boards and liners for protective headgear. Structural foams may also be made. In some embodiments, polymers of the foams may be crosslinked.

In some embodiments, the invention encompasses articles made by injection molding the PPC or PPC blends described hereinabove. Such injection molded items include disposable items such as food service containers and utensils as well as more durable including but not limited to items such as consumer goods, toys, parts for appliance, electronics, and automotive applications.

In some embodiments, the present invention encompasses optical components containing structurally precise PPC or blends thereof. In one aspect the invention encompasses digital memory media such as compact discs or DVDs containing PPC or PPC blends. In another aspect the invention encompasses lenses, prisms and mirrors consisting of, containing or coated with PPC or PPC blends.

In certain embodiments, the present invention encompasses packaging materials comprising one or more of the PPC compositions described above.

In certain embodiments, packaging materials of the present invention comprise films. In some embodiments, films comprise at least 10% PPC by weight. In some embodiments, the films comprise at least 20% PPC by weight. In some embodiments, the films comprise at least 30% PPC by weight. In some embodiments, the films comprise at least 50% PPC by weight. In some embodiments, the films comprise at least 70% PPC by weight. In some embodiments, the films comprise at least 90% PPC by weight.

In certain embodiments, packaging materials of the present invention comprise blown films. In some embodiments, the invention encompasses extruded films. In some embodiments, the films are between about 0.01 and about 100 mils in thickness. In some embodiments, a film is between about 0.1 and about 10 mils, between about 0.2 and about 5 mils or between about 0.5 and about 3 mils in thickness.

In some embodiments, packaging films of the present invention are laminate films. In some embodiments, laminate films of the present invention include a polymer selected from the group consisting of: polyolefin, polyester, polyether, polyamide, polystyrene, polyvinyl chloride, polyethylene terephthalate, fluorinated polymers, and mixtures of any two or more of these. In certain embodiments, laminate films of the present invention include a polymer selected from the group consisting of: polylactide, poly(hydroxy alkanoate), aliphatic polycarbonate other than polypropylene carbonate), aromatic polycarbonate, polyvinyl alcohol, Nylon™, and mixtures of any two or more of these.

In some embodiments, the present invention encompasses single serving sachets comprising structurally precise PPC as described above. In certain embodiments such sachets are for packaging personal care products such as soaps or shampoos. In certain embodiments such sachets are for packaging food products such as condiments.

In some embodiments, the present invention encompasses molding resins containing structurally precise PPC as described hereinabove.

In some embodiments, the present invention encompasses clamshell packages comprising structurally precise PPC as described above.

EXAMPLES

Examples 1 through 4 describe methods of making structurally precise PPC of the present invention. By using different chain transfer agents and controlling the amount of water present in the reactions, the identity and relative ratios of chain types in the samples are changed.

Example 1

Synthesis of PPC Comprising Chains of $B^2$ and C

A 1-liter Parr reactor was charged with 200 grams propylene oxide containing 33 ppm water, 123 mg of racemic N,N'-Bis(3,5-di-tert-butylsalicylidene)-1,2-cyclohexanediamino cobalt(III) trifluoroacetate (salcyCoTFA) catalyst and 112 mg bis(triphenylphosphine)iminium trifluoroacetate (PPN-TFA) co-catalyst. The reactor was sealed, pressurized to 100 psi with $CO_2$, and agitated at 250 rpm while the temperature was maintained at 35° C. After 23 hours, the polymerization was quenched with 2.1 equivs of methane sulfonic acid (MSA) in 200 g acetone. The reaction mixture was distilled to remove unreacted propylene oxide and the sample was then precipitated in 50/50 MeOH/H$_2$O to isolate the solid polymer. The recovered polymer was dried in a vacuum oven, then redissolved at 20 wt % into acetone, and precipitated a second time. Recovered polymer was dried in 75° C. vacuum oven for 8 hours. GPC analysis revealed the PPC sample resulting from Example 1 has a bimodal molecular weight distribution and contains approximately equal populations of chains with Mw of 230.8 kg/mol and 110 kg/mol, corresponding to chains of types C and B$^2$ respectively.

Example 1a

Synthesis of PPC Comprising Chains of A$^2$, B$^2$, and C

The PPC of this example is produced under conditions identical to Example 1, except 104 mg of bis(triphenylphosphine)iminium chloride (PPN-Cl) was substituted for the PPN-TFA). The presence and relative abundances of chains of types A$^2$ and B$^2$ can be detected by analytical methods to detect chlorine and fluorine. Suitable methods are known in the art and include mass spectroscopy and fluorine NMR among others.

Example 2

Synthesis of PPC Comprising Chains of B$^2$, C, and D$^5$

A 1-liter Parr reactor was charged with 200 grams propylene oxide containing 33 ppm water, 58 mg of dipropylene glycol, 123 mg of salcyCoTFA catalyst and 112 mg PPN-TFA co-catalyst. The reactor was sealed, pressurized to 100 psi with CO$_2$, and agitated at 250 rpm while the temperature was maintained at 35° C. After 23 hours, the polymerization was quenched with 2.1 equivs of methane sulfonic acid (MSA) in 200 g acetone. The reaction mixture was distilled to remove unreacted propylene oxide and the sample was then precipitated in 50/50 MeOH/H$_2$O to isolate the solid polymer. The recovered polymer was dried in a vacuum oven, then redissolved at 20 wt % into acetone, and precipitated a second time. Recovered polymer was dried in 75° C. vacuum oven for 8 hours.

Example 3

Synthesis of PPC Comprising Chains of B$^2$, C, and D$^8$

This material was produced under conditions identical to those described in Example 2 except 76 mg glycerol propoxylate was substituted for the dipropylene glycol.

Example 4

Synthesis of PPC Comprising Chains of B$^2$, C, and D$^9$

This material was produced under conditions identical to those described in Example 2 except 92 mg pentaerythritol propoxylate was substituted for the dipropylene glycol.

Example 5

Gel permeation chromatography (GPC) of the polymers from Examples 2 through 4 were obtained (FIG. 1). GPC traces of PPC from examples 2 through 4 are shown in FIG. 1. The sample resulting from Example 2 has a bimodal molecular weight distribution and contains predominantly chains with Mw of approximately 120 kg/mol (a mixture of chains of type D$^5$ and C) with a smaller population of chains with Mw of approximately 60 kg/mol, corresponding to a mixture of chains of type B$^2$. The samples from Examples 3 and 4 each show a characteristic trimodal molecular weight distribution in the GPC. The three components correspond to chains of type B$^2$ (the low molecular weight population), a middle population containing chains of type C and a high Mw population corresponding to chains of type D$^8$ (Example 3) or D$^9$ (Example 4).

The ratio of these chain types can be manipulated using the methods disclosed in the preceding examples or by physical blending of samples having different chain types to provide PPC compositions with varying melt flow indices (MFIs). In certain applications having a higher MFI can be advantageous for injection molding and extrusion operations to make plastic articles of the present invention. The PPC of Example 2 was found to have an MFI of 2.56 g/10 min when measured at 170° C. at 2.16 kg. Under the same conditions, the PPC of Example 3 was found to have an MFI of 2.35 g/10 min while that of Example 4 was found to be 0.79 g/10 min. It will be appreciated that the skilled artisan can use these trends to formulate PPC compositions with a range of melt flow properties.

In examples 6 through 7, PPC of the present invention was passed through an extruder at 170° C. and injection molded to make tensile bars and extruded into films of various thicknesses. Attempts were made to treat prior art PPC available commercially under the trade name QPAC, but the prior art material was either unable to be processed under these conditions or yielded films and tensile bars with that were extremely soft and lacked the structural integrity exhibited by the samples of the inventive PPC. Without being bound by any theory or thereby limiting the scope of the claimed invention, it is believed this may be due to thermal degradation of the commercial PPC during the extrusion process at these temperatures (FIG. 2).

Figure 2:
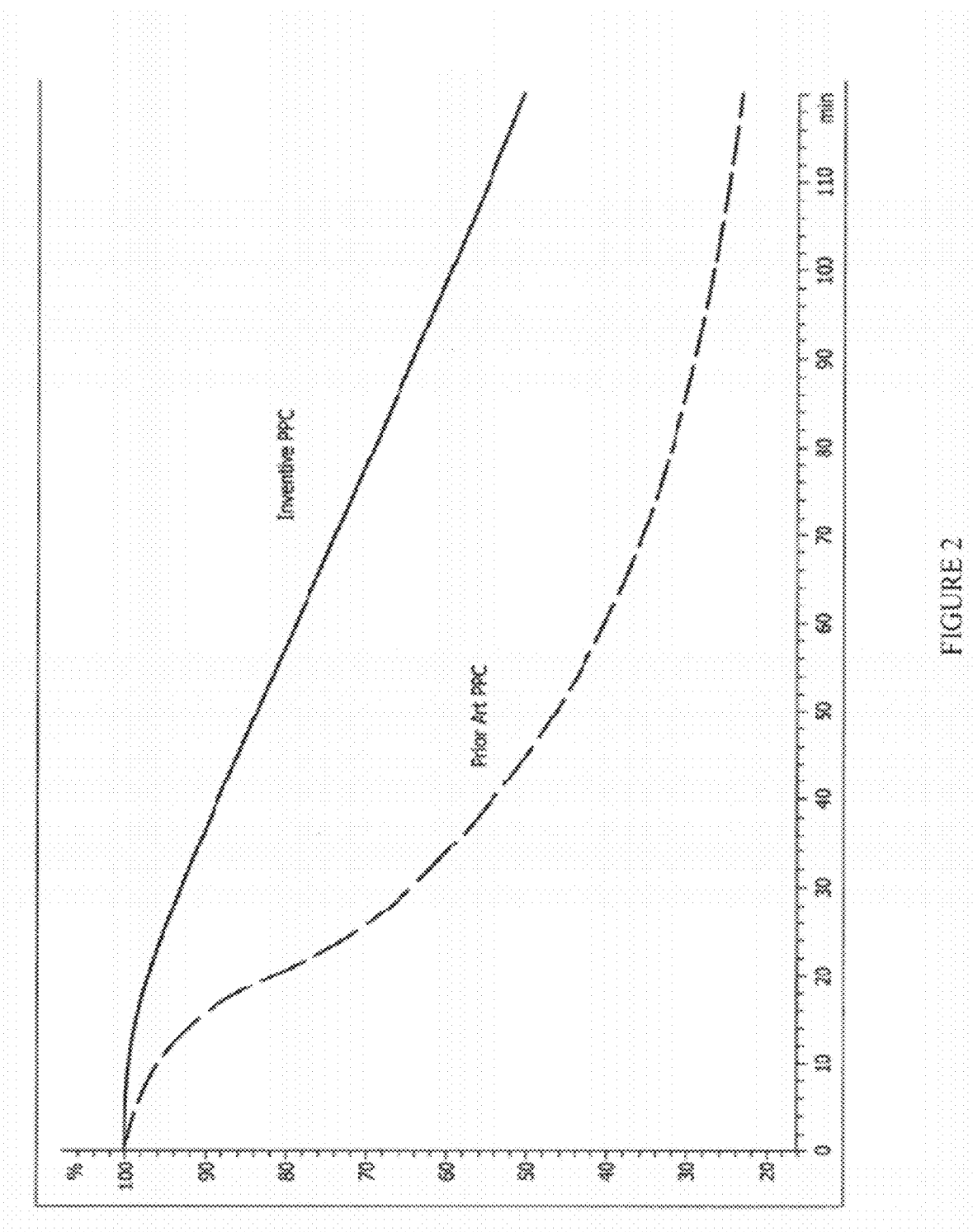
FIG. 2 shows a plot demonstrating the thermal stability of prior art PPC and PPC of the present invention at 200° C. over 2 hours.

FIG. 2 plots the mass over time of two samples of PPC held at 200° C. As can be seen, the prior art PPC (produced with zinc-based catalysts) loses mass at a higher rate than the inventive PPC. This behavior makes processing prior art PPC at typical thermoplastic extrusion temperatures more challenging than with PPC of the present invention.

Example 6

PPC of the present invention was fed to a single-screw extruder with a 4" film die. The extruder temperature was maintained at 170° C. Films of 100 microns, 200 microns, 500 microns, and 900 microns were obtained by adjusting the die opening. The films were cooled by passing them through a roll-system with water-cooled rolls. The films obtained were clear and tough and could be used for thermoforming various articles.

Example 6a

An Illig SB53-C1 thermoformer equipped with vacuum system was used to form small cups from each of the PPC films of Example 6. The thermoforming conditions of PPC films are summarized as follows:

| PPC Film | Heater* | Pyrometer** | Heating Time |
|---|---|---|---|
| 1 0.1 mm thick | 300° C. | 130° C. | 15 sec |
| 2 0.2 mm thick | 300° C. | 130° C. | 25 sec |
| 3 0.9 mm thick | 300° C. | 130° C. | 135 sec |

*Temperature setup in the ceramic heaters
**In thermoforming, the processing is controlled by temperature, achieved through a pyrometer which monitors the temperature of the PPC sheet, heated by the radiation of the ceramic heaters. That is, the male mold moves up and the vacuum is turned on when the surface temperature reaches the setting point, 130 ° C.

Example 7

PPC similar to that described in Example 1 (Novomer PPC) was fed to an injection molding machine through a feed hopper. Upon entrance into the barrel, the resin is heated to 170° C. and fed into the mold. Dogbones and flat bars were molded to be tested per ASTM standards, as described below.
1. Tensile Properties (tensile strength, percent elongation; tensile modulus): ASTM D638-08 (ISO 527)
2. Flexural Test: ASTM D790 (ISO 178)
3. Notched Izod Impact: ASTM D256, ISO 180
4. Heat Deflection Temperature (or Deflection Temperature Under Load): ASTM D 648, ISO 75.
5. Melt Flow Index (on PPC powder or pellets): ASTM D1238, ISO 1133

| Property | Unit | Novomer PPC |
|---|---|---|
| Tensile Strength at Yield | MPa | 39.5 |
| Elongation at Yield | % | 3.24% |
| Flexural Modulus | MPa | 2525 |
| Tensile Modulus | MPa | 1447 |
| Notched Izod Impact | ft-lb/inch | 0.6721 |
| Heat Deflection Temp. | ° C. | 33 |

Example 8

In this example, PPC of the present invention (Novomer PPC) was blended with polyolefins and made into various articles including films, injection molded items and blow molded bottles. Unexpectedly, the inventive PPC survived the extrusion process and provided useful blends with polyolefins.

PPC of the present invention (similar to that described in Example 1) was blended at 30 or 50 weight % with either low density polyethylene (LLDPE), high density polyethylene (HDPE), or polypropylene (PP) in a twin-screw extruder. Temperature of the extruder was set at 180° C. for the LLDPE and 190° C. for HDPE and PP. A compatibilizer was used to enable enhanced dispersion of PPC and the polyolefin. Typically, the compatibilizer was loaded at a maximum of 20-22% of the dispersed phase. Thus, a 50/50 polyolefin/PPC blend was formulated as: 45/45/10::Polyolefin/PPC/compatibilizer and a 70/30 polyolefin/PPC blend was formulated as: 66/28/6::Polyolefin/PPC/compatibilizer. An anyhydride modified LLDPE was used as the compatibilizer for LLDPE blends and HDPE while an anyhydride modified PP was used as the compatibilizer for PP blends. Pellets of these blends were made by passing the melt from the twin-screw extruder through a strand die into a pelletizer. These pellets were then used to make film, injection molded parts, and thermoformed articles, as described above for pure PPC. In one case (HDPE blends), the pellets were also used to make blow-molded articles like bottles for detergent and shampoo use using traditional extrusion-blow molding equipment. Physical data for the blends of Example 8 are shown in FIG. 3.

It is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A packaging material comprising poly(propylene carbonate) wherein, on average in the poly(propylene carbonate), at least 80% of adjacent monomer units are oriented head-to-tail.

2. The packaging material of claim 1, wherein on average in the poly(propylene carbonate), at least 90% of linkages between adjacent monomer units are carbonate linkages.

3. The packaging material of claim 1, wherein the number average molecular weight of the poly(propylene carbonate) is between about 40,000 g/mol and about 400,000 g/mol.

4. The packaging material of claim 3, wherein the number average molecular weight of the poly(propylene carbonate) is between about 100,000 g/mol and about 300,000 g/mol.

5. The packaging material of claim 1, wherein the poly (propylene carbonate) comprises chains having a formula A:

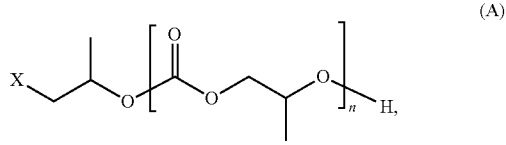

in combination with chains having formula $D^3$:

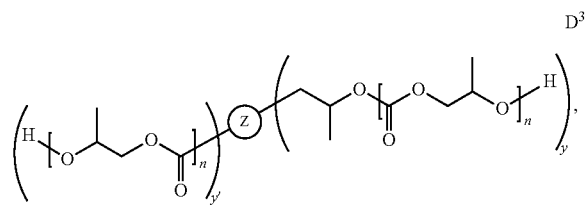

wherein, X represents the bound form of a nucleophile that can ring-open an epoxide;
n is at each occurrence, an integer from about 50 to about 3,000;
y and y' are each independently an integer from 0 to 6 and y+y' is greater than 2; and
(z) represents a polyfunctional compound containing two or more functional groups that can react with carbon dioxide or propylene oxide to initiate a polymer chain.

6. The packaging material of claim 5, wherein the poly (propylene carbonate) further comprises chains of formula B:

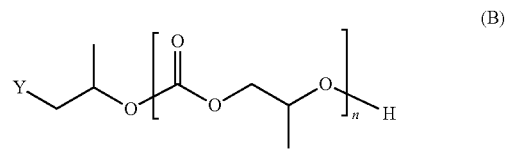

wherein Y is the bound form a nucleophile that can ring open an epoxide; and

X and Y are different.

7. The packaging material of claim 5, wherein $D^3$ comprises chains of formula:

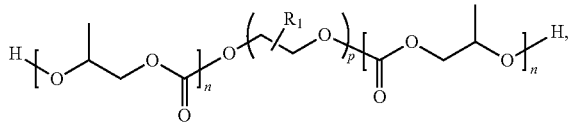

wherein p is an integer from 1 to 200 inclusive; and $R^1$ is optionally present, and if present is methyl.

8. The packaging material of claim 1, wherein the packaging material comprises a film.

9. An injection molded article comprising a packaging material of claim 1.

10. A blow molded article comprising a packaging material of claim 1.

11. A single serving sachet comprising a packaging material of claim 1.

12. A food packaging film comprising a packaging material of claim 1.

13. A clamshell package comprising a packaging material of claim 1.

14. A molding resin comprising poly(propylene carbonate) wherein, on average in the poly(propylene carbonate), at least 80% of adjacent monomer units are oriented head-to-tail.

15. The molding resin of claim 14, wherein on average in the poly(propylene carbonate), at least 90% of linkages between adjacent monomer units are carbonate linkages.

16. The molding resin of claim 15, at least 99% of linkages between adjacent monomer units are carbonate linkages.

17. The molding resin of claim 15, wherein the number average molecular weight of the polypropylene carbonate) is between about 100,000 g/mol and about 300,000 g/mol.

18. The molding resin of claim 14, wherein the poly(propylene carbonate) comprises chains having a formula A:

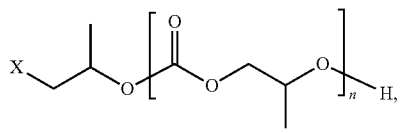

(A)

in combination with chains having formula $D^3$:

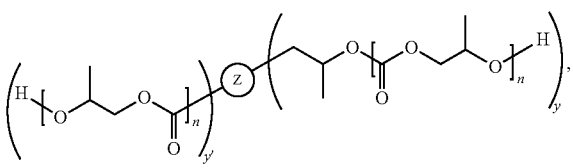

wherein, X represents the bound form of a nucleophile that can ring-open an epoxide;

n is at each occurrence, an integer from about 50 to about 3,000;

y and y' are each independently an integer from 0 to 6 and y+y' is greater than 2; and Ⓩ represents a polyfunctional compound containing two or more functional groups that can react with carbon dioxide or propylene oxide to initiate a polymer chain.

19. The molding resin of claim 18, wherein the poly(propylene carbonate) further comprises chains of formula B:

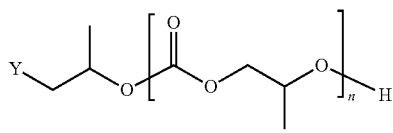

(B)

wherein Y is the bound form a nucleophile that can ring open an epoxide; and

X and Y are different.

20. The molding resin of claim 18, wherein $D^3$ comprises chains of formula:

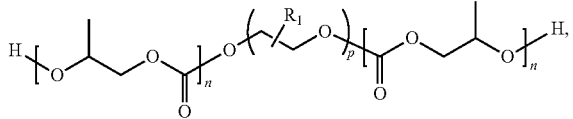

wherein p is an integer from 1 to 200 inclusive; and $R^1$ is optionally present, and if present is methyl.

21. The molding resin of claim 14, further comprising one or more additives selected from the group consisting of: processing aids, flame retardants, colorants, compatibilizers, antioxidants, fillers and plasticizers.

22. An injection molded article comprising a molding resin of claim 14.

23. A blow molded article comprising a molding resin of claim 14.

* * * * *